United States Patent
Tiwari et al.

(10) Patent No.: US 11,514,046 B2
(45) Date of Patent: *Nov. 29, 2022

(54) TIERING WITH PLUGGABLE STORAGE SYSTEM FOR PARALLEL QUERY ENGINES

(71) Applicant: EMC IP Holding Company LLC, Hopkinton, MA (US)

(72) Inventors: Sameer Tiwari, Fremont, CA (US); Milind Arun Bhandarkar, San Jose, CA (US); Bhooshan Deepak Mogal, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 337 days.

This patent is subject to a terminal disclaimer.

(21) Appl. No.: 16/865,164

(22) Filed: May 1, 2020

(65) Prior Publication Data
US 2020/0257690 A1 Aug. 13, 2020

Related U.S. Application Data

(63) Continuation of application No. 15/814,695, filed on Nov. 16, 2017, now Pat. No. 10,719,510, which is a (Continued)

(51) Int. Cl.
*G06F 16/00* (2019.01)
*G06F 16/2453* (2019.01)
(Continued)

(52) U.S. Cl.
CPC ........ *G06F 16/24542* (2019.01); *G06F 16/10* (2019.01); *G06F 16/11* (2019.01);
(Continued)

(58) Field of Classification Search
CPC .... G06F 16/24542; G06F 16/10; G06F 16/11; G06F 16/148; G06F 16/182;
(Continued)

(56) References Cited

U.S. PATENT DOCUMENTS

| 5,191,611 A | 3/1993 | Lang |
| 5,495,607 A | 2/1996 | Pisello |

(Continued)

OTHER PUBLICATIONS

Tolia et al., "Opportunistic Use of Content Addressable Storage for Distributed File Systems," USENIX Annual, Usenix.org, pp. 1-14. (Year: 2003).*

(Continued)

*Primary Examiner* — Cheryl Lewis
(74) *Attorney, Agent, or Firm* — Chamberlain, Hrdlicka, White, Williams & Aughtry

(57) ABSTRACT

A method, article of manufacture, and apparatus for managing data. In some embodiments, this includes determining a usage level of a file, wherein the file is stored in a first storage system, moving the file to a second storage system based on the determined usage level of the file updating location information in a catalog based on the movement of the file, and performing at least a portion of a query on the file after updating location information in the catalog.

20 Claims, 3 Drawing Sheets

Related U.S. Application Data continuation of application No. 13/842,955, filed on Mar. 15, 2013, now Pat. No. 9,898,475.

(60) Provisional application No. 61/769,043, filed on Feb. 25, 2013.

(51) Int. Cl.

| | | |
|---|---|---|
| *G06F 16/10* | (2019.01) | |
| *G06F 16/11* | (2019.01) | |
| *G06F 16/27* | (2019.01) | |
| *G06F 16/14* | (2019.01) | |
| *G06F 16/182* | (2019.01) | |
| *G06F 16/907* | (2019.01) | |
| *G06F 16/18* | (2019.01) | |
| *G06F 16/2455* | (2019.01) | |
| *G06F 16/2458* | (2019.01) | |
| *G06F 16/2452* | (2019.01) | |
| *H04L 67/1097* | (2022.01) | |
| *H04L 65/60* | (2022.01) | |
| *G06F 16/43* | (2019.01) | |
| *G06F 16/21* | (2019.01) | |
| *G06F 16/245* | (2019.01) | |

(52) U.S. Cl.
CPC ......... *G06F 16/148* (2019.01); *G06F 16/182* (2019.01); *G06F 16/1858* (2019.01); *G06F 16/2453* (2019.01); *G06F 16/2455* (2019.01); *G06F 16/2471* (2019.01); *G06F 16/24524* (2019.01); *G06F 16/24532* (2019.01); *G06F 16/27* (2019.01); *G06F 16/907* (2019.01); *H04L 65/60* (2013.01); *H04L 67/1097* (2013.01); *H05K 999/99* (2013.01); *G06F 16/113* (2019.01); *G06F 16/217* (2019.01); *G06F 16/245* (2019.01); *G06F 16/43* (2019.01)

(58) Field of Classification Search
CPC ............. G06F 16/1858; G06F 16/2453; G06F 16/2455; G06F 16/2471; G06F 16/24524; G06F 16/24532; G06F 16/27; G06F 16/907; G06F 16/113; G06F 16/245; G06F 16/43

See application file for complete search history.

(56) References Cited

U.S. PATENT DOCUMENTS

| | | |
|---|---|---|
| 5,655,116 A | 8/1997 | Kirk |
| 5,706,514 A | 1/1998 | Bonola |
| 5,922,030 A | 7/1999 | Shank |
| 6,266,682 B1 | 7/2001 | Lamarca |
| 6,269,380 B1 | 7/2001 | Terry |
| 6,564,252 B1 | 5/2003 | Hickman |
| 6,718,372 B1 | 4/2004 | Bober |
| 6,745,385 B1 | 6/2004 | Lupu |
| 6,907,414 B1 | 6/2005 | Parnell |
| 6,912,482 B2 | 6/2005 | Kaiser |
| 6,947,925 B2 | 9/2005 | Newcombe |
| 6,996,582 B2 | 2/2006 | Daniels |
| 7,035,931 B1 | 4/2006 | Zayas |
| 7,069,421 B1 | 6/2006 | Yates, Jr. |
| 7,177,823 B2 | 2/2007 | Lam |
| 7,194,513 B2 | 3/2007 | Sharif |
| 7,254,636 B1 | 8/2007 | O'Toole, Jr. |
| 7,313,512 B1 | 12/2007 | Traut |
| 7,346,751 B2 | 3/2008 | Prahlad |
| 7,415,038 B2 | 8/2008 | Ullmann |
| 7,475,199 B1 | 1/2009 | Bobbitt |
| 7,493,311 B1 | 2/2009 | Cutsinger |
| 7,574,443 B2 | 8/2009 | Bahar |
| 7,593,938 B2 | 9/2009 | Lemar |
| 7,613,947 B1 | 11/2009 | Coatney |
| 7,653,699 B1 | 1/2010 | Colgrove |
| 7,689,535 B2 | 3/2010 | Bernard |
| 7,689,609 B2 | 3/2010 | Lango |
| 7,702,625 B2 | 4/2010 | Peterson |
| 7,716,261 B2 | 5/2010 | Black |
| 7,720,841 B2 | 5/2010 | Gu |
| 7,739,316 B2 | 6/2010 | Thompson |
| 7,761,678 B1 | 7/2010 | Bodmer |
| 7,774,335 B1 | 8/2010 | Scofield |
| 7,827,201 B1 | 11/2010 | Gordon |
| 7,949,693 B1 | 5/2011 | Mason |
| 7,958,303 B2 | 6/2011 | Shuster |
| 7,978,544 B2 | 7/2011 | Bernard |
| 7,984,043 B1 | 7/2011 | Waas |
| 8,010,738 B1 | 8/2011 | Chilton |
| 8,028,290 B2 | 9/2011 | Rymarczyk |
| 8,041,735 B1 | 10/2011 | Lacapra |
| 8,051,113 B1 | 11/2011 | Shekar |
| 8,131,739 B2 | 3/2012 | Wu |
| 8,180,813 B1 | 5/2012 | Goodson |
| 8,185,488 B2 | 5/2012 | Chakravarty |
| 8,195,769 B2 | 6/2012 | Miloushev |
| 8,200,723 B1 | 6/2012 | Sears |
| 8,219,681 B1 | 7/2012 | Glade |
| 8,255,430 B2 | 8/2012 | Dutton |
| 8,255,550 B1 | 8/2012 | Becher |
| 8,301,822 B2 | 10/2012 | Pinto |
| 8,312,037 B1 | 11/2012 | Bacthavachalu |
| 8,332,526 B2 | 12/2012 | Kruse |
| 8,352,429 B1 | 1/2013 | Mamidi |
| 8,392,400 B1 | 3/2013 | Ransil |
| 8,417,681 B1 | 4/2013 | Miloushev |
| 8,452,821 B2 | 5/2013 | Shankar |
| 8,484,259 B1 | 7/2013 | Makkar |
| 8,533,183 B2 | 9/2013 | Hokanson |
| 8,543,564 B2 | 9/2013 | Conrad |
| 8,543,596 B1 | 9/2013 | Kostamaa |
| 8,577,911 B1 | 11/2013 | Stepinski |
| 8,578,096 B2 | 11/2013 | Malige |
| 8,595,237 B1 | 11/2013 | Chaudhary |
| 8,682,853 B2 | 3/2014 | Zane |
| 8,682,922 B2 | 3/2014 | Boneti |
| 8,700,875 B1 | 4/2014 | Barron |
| 8,751,533 B1 | 6/2014 | Dhavale |
| 8,762,330 B1 | 6/2014 | Kick |
| 8,825,752 B1 | 9/2014 | Madhavan |
| 8,832,154 B1 | 9/2014 | Srinivasan |
| 8,856,286 B2 | 10/2014 | Barsness |
| 8,971,916 B1 | 3/2015 | Joyce |
| 9,026,559 B2 | 5/2015 | Bernbo |
| 9,118,697 B1 | 8/2015 | Kishore |
| 9,146,766 B2 | 9/2015 | Shaikh |
| 9,323,758 B1 | 4/2016 | Stacey |
| 9,449,007 B1 | 9/2016 | Wood |
| 9,628,438 B2 | 4/2017 | Hardin |
| 9,674,294 B1 | 6/2017 | Gonthier |
| 9,684,571 B2 | 6/2017 | Modukuri |
| 9,727,588 B1 | 8/2017 | Ostapovicz |
| 9,805,053 B1 | 10/2017 | Tiwari |
| 9,886,217 B2 | 2/2018 | Tsuchiya |
| 9,984,083 B1 | 5/2018 | Tiwari |
| 2002/0002638 A1 | 1/2002 | Obara |
| 2002/0049782 A1 | 4/2002 | Herzenberg |
| 2002/0133810 A1 | 9/2002 | Giles |
| 2002/0146035 A1 | 10/2002 | Tyndall |
| 2002/0156840 A1 | 10/2002 | Ulrich |
| 2003/0126120 A1 | 7/2003 | Faybishenko |
| 2003/0172094 A1 | 9/2003 | Lauria |
| 2003/0191745 A1 | 10/2003 | Jiang |
| 2003/0229637 A1 | 12/2003 | Baxter |
| 2004/0054748 A1 | 3/2004 | Ackaouy |
| 2004/0078467 A1 | 4/2004 | Grosner |
| 2004/0088282 A1 | 5/2004 | Xu |
| 2004/0098415 A1 | 5/2004 | Bone |
| 2004/0143571 A1 | 7/2004 | Bjornson |
| 2004/0205143 A1 | 10/2004 | Uemura |
| 2005/0071338 A1 | 3/2005 | Sugioka |

(56) References Cited

U.S. PATENT DOCUMENTS

| | | |
|---|---|---|
| 2005/0091287 A1 | 4/2005 | Sedlar |
| 2005/0144254 A1 | 6/2005 | Kameda |
| 2005/0165777 A1 | 7/2005 | Hurst-Hiller |
| 2005/0198401 A1 | 9/2005 | Chron |
| 2005/0216788 A1 | 9/2005 | Mani-Meitav |
| 2006/0005188 A1 | 1/2006 | Vega |
| 2006/0010433 A1 | 1/2006 | Neil |
| 2006/0037069 A1 | 2/2006 | Fisher |
| 2006/0080465 A1 | 4/2006 | Conzola |
| 2006/0136653 A1 | 6/2006 | Traut |
| 2006/0146057 A1 | 7/2006 | Blythe |
| 2006/0149793 A1 | 7/2006 | Kushwah |
| 2006/0173751 A1 | 8/2006 | Schwarze |
| 2006/0212457 A1 | 9/2006 | Pearce |
| 2006/0248528 A1 | 11/2006 | Oney |
| 2007/0282951 A1 | 12/2007 | Selimis |
| 2008/0059746 A1 | 3/2008 | Fisher |
| 2008/0172281 A1 | 7/2008 | Probst |
| 2008/0281802 A1 | 11/2008 | Peterson |
| 2008/0313183 A1 | 12/2008 | Cunningham |
| 2008/0320151 A1 | 12/2008 | McCanne |
| 2009/0007105 A1 | 1/2009 | Fries |
| 2009/0007161 A1 | 1/2009 | Sheehan |
| 2009/0089344 A1 | 4/2009 | Brown |
| 2009/0106255 A1 | 4/2009 | Lacapra |
| 2009/0132609 A1 | 5/2009 | Barsness |
| 2009/0210431 A1 | 8/2009 | Marinkovic |
| 2009/0222569 A1 | 9/2009 | Frick |
| 2009/0222896 A1 | 9/2009 | Ichikawa |
| 2009/0254916 A1 | 10/2009 | Bose |
| 2009/0259665 A1 | 10/2009 | Howe |
| 2009/0265400 A1 | 10/2009 | Pudipeddi |
| 2009/0328225 A1 | 12/2009 | Chambers |
| 2010/0036840 A1 | 2/2010 | Pitts |
| 2010/0042655 A1 | 2/2010 | Tse |
| 2010/0145917 A1 | 6/2010 | Bone |
| 2010/0241673 A1 | 9/2010 | Wu |
| 2010/0274772 A1 | 10/2010 | Samuels |
| 2010/0287170 A1 | 11/2010 | Liu |
| 2011/0113052 A1 | 5/2011 | Hornkvist |
| 2011/0137966 A1 | 6/2011 | Srinivasan |
| 2011/0153662 A1 | 6/2011 | Stanfill |
| 2011/0153697 A1 | 6/2011 | Nickolov |
| 2011/0179250 A1 | 7/2011 | Matsuzawa |
| 2011/0213928 A1 | 9/2011 | Grube |
| 2011/0238814 A1 | 9/2011 | Pitts |
| 2011/0302583 A1 | 12/2011 | Abadi |
| 2011/0313973 A1 | 12/2011 | Srivas |
| 2012/0023145 A1 | 1/2012 | Brannon |
| 2012/0036107 A1 | 2/2012 | Miloushev |
| 2012/0066274 A1 | 3/2012 | Stephenson |
| 2012/0089470 A1 | 4/2012 | Barnes, Jr. |
| 2012/0095952 A1 | 4/2012 | Archambeau |
| 2012/0095992 A1 | 4/2012 | Cutting |
| 2012/0101991 A1 | 4/2012 | Srivas |
| 2012/0166483 A1 | 6/2012 | Choudhary |
| 2012/0185913 A1 | 7/2012 | Martinez |
| 2012/0278471 A1 | 11/2012 | Labowicz |
| 2012/0310916 A1 | 12/2012 | Abadi |
| 2012/0311572 A1 | 12/2012 | Falls |
| 2012/0317388 A1 | 12/2012 | Driever |
| 2012/0323844 A1 | 12/2012 | Chatley |
| 2013/0007091 A1 | 1/2013 | Rao |
| 2013/0036272 A1 | 2/2013 | Nelson |
| 2013/0091094 A1 | 4/2013 | Nelke |
| 2013/0132967 A1 | 5/2013 | Soundararajan |
| 2013/0151884 A1 | 6/2013 | Hsu |
| 2013/0166543 A1 | 6/2013 | MacDonald |
| 2013/0185735 A1 | 7/2013 | Farrell |
| 2013/0198716 A1 | 8/2013 | Huang |
| 2013/0212321 A1* | 8/2013 | Talagala ............ G06F 12/0246 711/103 |
| 2013/0246347 A1 | 9/2013 | Sorenson |
| 2013/0262443 A1 | 10/2013 | Leida |
| 2013/0275653 A1 | 10/2013 | Ranade |
| 2013/0282650 A1 | 10/2013 | Zhang |
| 2014/0059310 A1 | 2/2014 | Du |
| 2014/0136483 A1 | 5/2014 | Chaudhary |
| 2014/0136779 A1 | 5/2014 | Guha |
| 2014/0149392 A1 | 5/2014 | Wang et al. |
| 2014/0188825 A1 | 7/2014 | Muthukkaruppan |
| 2014/0188845 A1 | 7/2014 | Ah-Soon |
| 2014/0195558 A1 | 7/2014 | Murthy |
| 2014/0201234 A1 | 7/2014 | Lee |
| 2014/0337323 A1 | 11/2014 | Soep |
| 2015/0120711 A1 | 4/2015 | Liensberger |
| 2016/0150019 A1 | 5/2016 | Klinkner |

OTHER PUBLICATIONS

Liao et al. Multi-dimensional Index on Hadoop Distributed File System, 2010, Fifth IEEE International Conference on Networking, Architecture, and Storage, pp. 240-249.

Xie et al. "Improving MapReduce Performance through Data Placement in Heterogeneous Hadoop Clusters," 2010 IEEE International Symposium on Parallel & Distributed Processing, Workshops and Phd Forum (IPDPSW), Atlanta, GA, 2010, pp. 1-9. Year: 2010.

* cited by examiner

TIERING WITH PLUGGABLE STORAGE SYSTEM FOR PARALLEL QUERY ENGINES

CROSS REFERENCE TO RELATED APPLICATIONS

This application is a continuation of co-pending U.S. patent application Ser. No. 15/814,695, entitled TIERING WITH PLUGGABLE STORAGE SYSTEM FOR PARALLEL QUERY ENGINES filed Nov. 16, 2017 which is incorporated herein by reference for all purposes, which is a continuation of U.S. patent application Ser. No. 13/842,955, entitled TIERING WITH PLUGGABLE STORAGE SYSTEM FOR PARALLEL QUERY ENGINES filed Mar. 15, 2013 which is incorporated herein by reference for all purposes, which claims priority to U.S. Provisional Application No. 61/769,043, entitled INTEGRATION OF MASSIVELY PARALLEL PROCESSING WITH A DATA INTENSIVE SOFTWARE FRAMEWORK filed Feb. 25, 2013 which is incorporated herein by reference for all purposes.

FIELD OF THE INVENTION

This invention relates generally to databases, and more particularly to systems and methods for managing datasets in databases.

BACKGROUND OF THE INVENTION

With the large amounts of data generated in recent years, data mining and machine learning are playing an increasingly important role in today's computing environment. For example, businesses may utilize either data mining or machine learning to predict the behavior of users. This predicted behavior may then be used by businesses to determine which plan to proceed with, or how to grow the business.

The data used in data mining and analytics is typically not stored in a uniform data storage system. Many data storage systems utilize different file systems, and those different file systems are typically not compatible with each other. Further, the data may reside in geographically diverse locations.

One conventional method to performing data analytics across different databases includes copying data from one databatase to a central database, and performing the data analytics on the central database. However, this results in an inefficient use of storage space, and creates issues with data consistency between the two databases.

There is a need, therefore, for an improved method, article of manufacture, and apparatus for managing data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
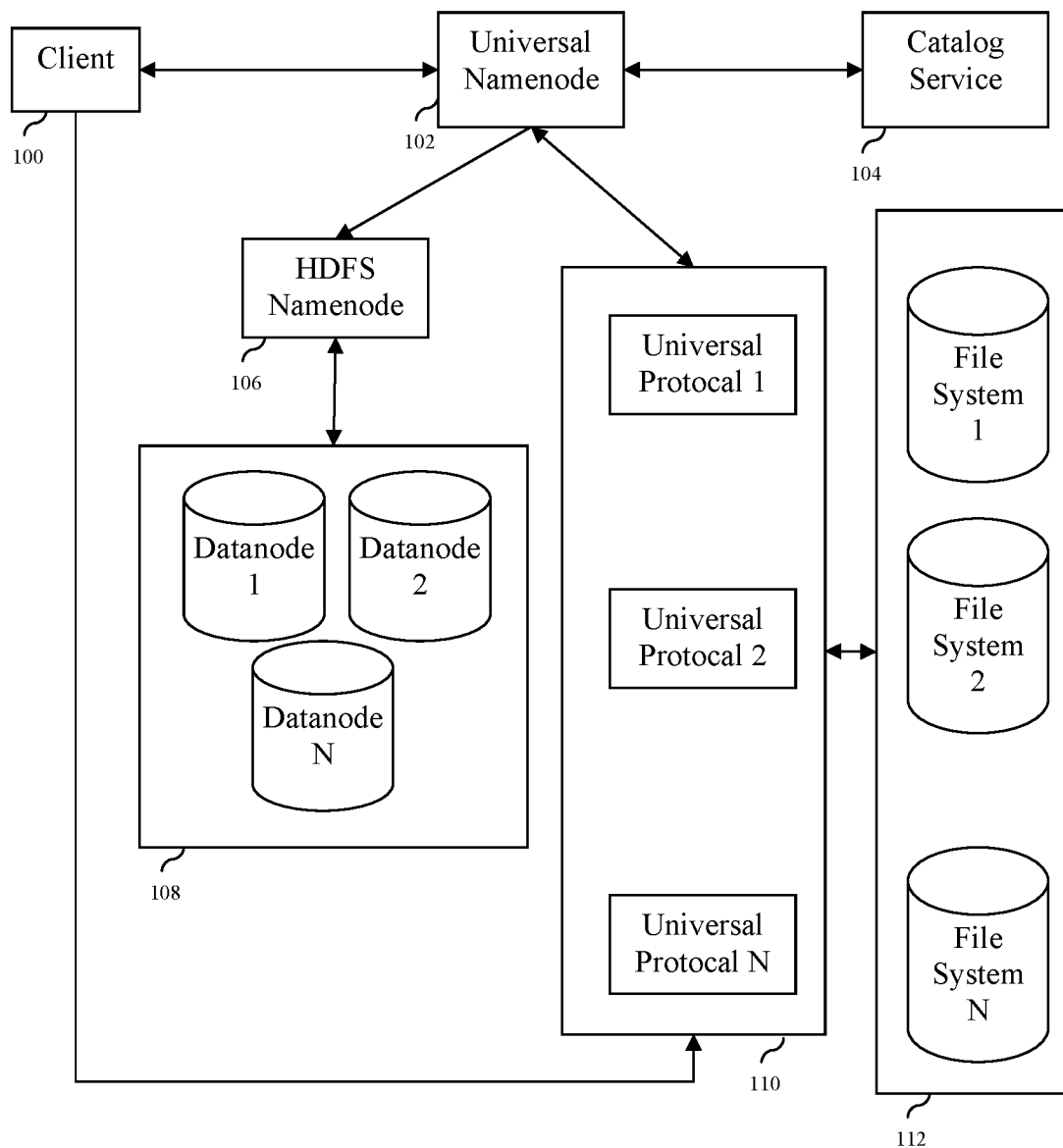
FIG. 1 illustrates a database system in accordance with some embodiments.

FIG. 1 illustrates a database system in accordance with some embodiments. Client 100 connects to Universal Namenode 102 when attempting to access data. Universal Namenode 102 access Catalog Service 104 to determine where the data is, and what type of file system the data resides in. Universal Namenode 102 may natively understand the hadoop file system (HDFS), and may readily communicate to HDFS Namenode 106. HDFS Namenode 106 is connected to Datanodes 108. Universal Namenode 102 may have several Universal Protocols 110, which allow Universal Namenode 102 to access storage systems utilizing different File Systems 112. File Systems 112 may be a diverse set of storage systems, which may utilize different file systems, such as the HDFS and NFS, among others.

Catalog 104, in some embodiments, may be a table that includes a file name and file location. For example, a simple table may include:

| File A | nfs://a/b/File A |
| File B | hdfs://xyz/File B |

This may be stored as a text file, a spreadsheet file, or any other data object capable of storing data in tabular form.

In some embodiments, each datanode, Hadoop datanode or otherwise, also includes a data node job tracker (not shown in FIG. 1). Data node job trackers track the jobs that are run as part of a query on their specific data node. These data node job trackers report back to a universal job tracker in the Universal Namenode 102 (not shown in FIG. 1). The universal job tracker tracks the status of all jobs for a given query received from Client 100. For example, suppose a client wants to sort all word files by creation date. To the client, all the word files may look as if they were stored in one location. However, unbeknownst to the client, the word files are scattered across different storage systems. Some word files which are accessed frequently may be stored in a high speed storage system. Some word files which are rarely accessed may be stored on a slower storage system. Suppose there are three storage systems: A, B, and C. The word files reside in storage systems A and B. The universal namenode would receive the client's sort query, and then ask the catalog to determine the location of the word files. Having determined that the word files are in A and B, the universal namenode would send out the jobs to the appropriate storage systems. Storage systems A and B would each run a sort job, and each would have a job tracker to keep track of the progress of the job.

By utilizing a Universal Node 102, Client 100 has a unified view across all data sources from a single namespace. In some embodiments, this namespace may be uss://. This is also helpful if Client 100 wants to perform Hadoop jobs on data that is not stored in HDFS. Instead of copying data from a non-HDFS to a HDFS storage system and running the Hadoop job, the data can remain on their respective storage systems, and the jobs will run on the storage system. The universal protocols allow the universal namenode to connect with different file systems. In some embodiments, the universal protocol may be stored in universal namenode. Following the above example, suppose storage system A runs file system A, and storage system B runs file system B. In order to interact with both file systems, universal namenode may have a protocol plugin A for file system A, and a protocol plugin B for file system B. These two plugins allow the universal namenode to communicate with the two different file systems.

As long as the universal namenode has the correct universal protocol plugin, any type of file system may be added to the system. Following the above example, suppose a storage system D with file system D was added. As long as the universal namenode has a universal protocol plugin for file system D, the storage system D can be added and used.

Figure 2:
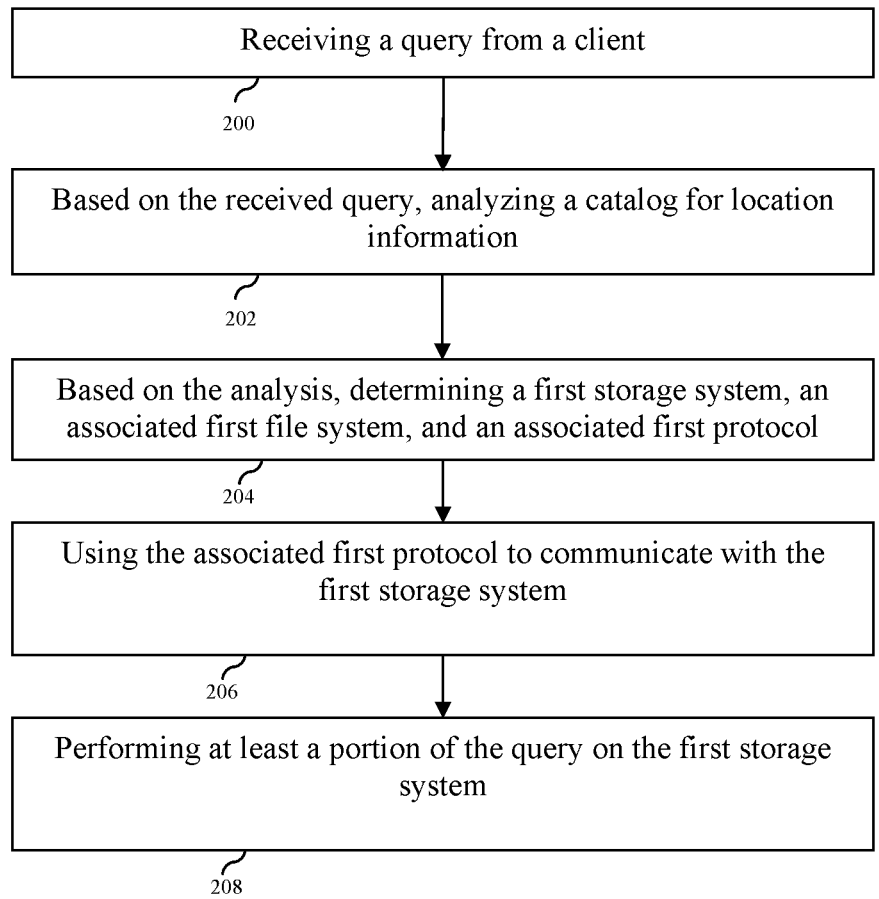
FIG. 2 is a flowchart of a method to manage data in accordance with some embodiments.

FIG. 2 is a flowchart of a method to manage data in accordance with some embodiments. In step 200, a query is received from a client. In step 202, a catalog is analyzed for location information based on the received query. In step 204, a first storage system, an associated first filing system, and an associated first protocol are determined based on the analysis. In step 206, the first protocol is used to communicate with the first storage system. In step 208, at least a portion of the query is performed on the first storage system.

Having a diverse array of storage systems allows for a system with multiple tiers of file storage. Although the client only sees one namespace (the universal namenode), many namespaces may reside under the universal namenode. These different namespaces may correspond to different types of storage systems—some with very high performance file systems, and some with low performance file systems. In some embodiments, it may be preferable to have multiple tiers of storage systems. For example, frequently accessed files may be stored on high performance file systems. Less frequently accessed files may be stored on file systems that are more optimized for storage and less for performance.

The level of activity may change for files. Frequently accessed files may be less frequently accessed, and vice versa. For example, a Q2 end report might be accessed very frequently during Q2 and Q3, but the report might not be accessed at all in Q4. In such cases, it may be preferable to move the file from one higher tier to a lower tier. With the universal namenode and catalog, moving the file from one tier to another is transparent to the client. Once the file has been moved, the catalog changes the location of the file. Previously, the location for the file may have been high_file_system://FileA. After the move, the location for the file may be low_file_system://FileA. The catalog only changes the location entry for the file. No other changes are necessary. The next time the client wants to access the file, the client will still use uss://FileA (the universal namespace), but the universal namenode will look at the catalog and determine that FileA is in the low_file_system namespace. The client does not need to keep track of which namespace the file is in.

In some embodiments, it may be preferable to copy some of the data from one storage system to another, even though the copy is not necessary to perform the query. For example, suppose storage system A and storage system B have some data that is required to run a query. Storage system A is connected via a high speed network connection and is also a high speed storage device. Storage system B is connected via a slower network connection, and is also a slower storage device. If the client wanted to perform the query as fast as possible, in may be preferable to temporarily copy some of the data on storage system B to storage system A. After the query has finished, the copied data may be removed from storage system A.

The usage of files may also be used to determine when and where to move data. For example, suppose File 1 is always accessed at 1 pm every Tuesday. Otherwise, it is never used. In some embodiments, this may constitute an inactive file, so File 1 is stored in a low performance storage system. However, File 1 may also be very large. When it is accessed at 1 pm every Tuesday, it takes a significant amount of time for the query to finish. With this statistic, it may be preferable to move File 1 to a high performance storage system at 12:30 pm every Tuesday, and move the file back to the low performance storage system after the query is complete. After the move, the catalog updates the location with the new location, and the universal namenode will now point to the new location. Similarly, after the query is complete, the catalog updates the location with the original location, and the universal namenode will now point to the original location. Since the client doesn't have to keep track of where the file is (e.g. what namespace to use), it makes no difference to the client running the query whether or not the file is moved.

Figure 3:
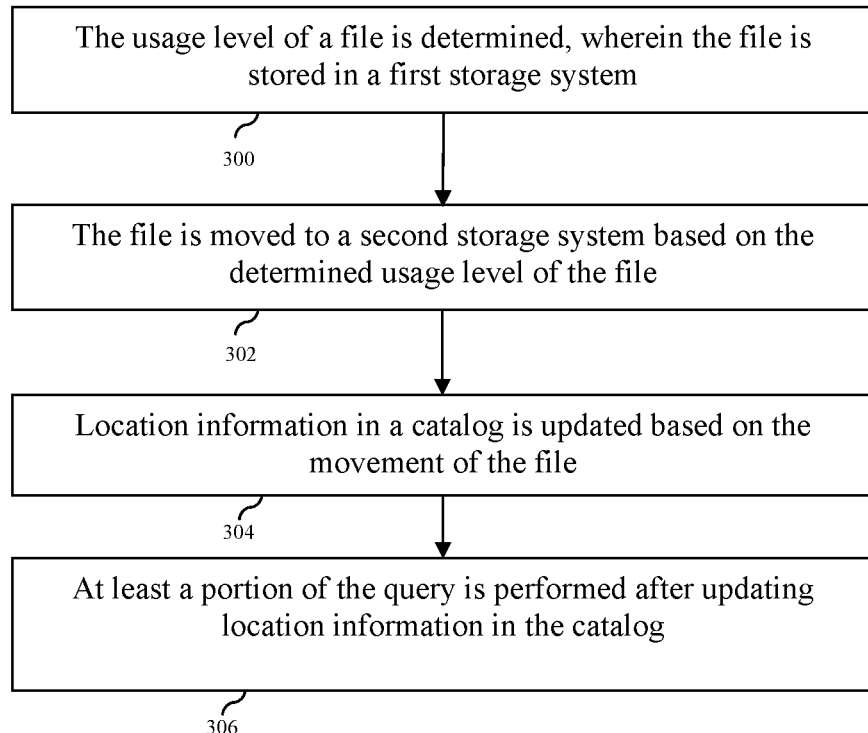
FIG. 3 is a flowchart of a method to manage data in accordance with some embodiments.

FIG. 3 is a flowchart of a method to manage data in accordance with some embodiments. In step 300, the usage level of a file is determined, wherein the file is stored in a first storage system. In step 302, the file is moved to a second storage system based on the determined usage level of the file. In step 304, location information in a catalog is updated based on the movement of the file. In step 306, at least a portion of the query is performed after updating location information in the catalog.

For the sake of clarity, the processes and methods herein have been illustrated with a specific flow, but it should be understood that other sequences may be possible and that some may be performed in parallel, without departing from the spirit of the invention. Further, though the techniques herein teach creating one SwR sample in parallel, those with ordinary skill in the art will readily appreciate that the techniques are easily extendable to generate many SwR samples. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A computer implemented method, comprising:
receiving, by a universal node comprising one or more processors, a query from a client;
accessing, by the universal node, a catalog comprising location information for one or more files stored across one or more storage systems, the one or more storage systems comprising a first storage system and a second storage system, and the universal node being configured to interface with the first storage system and the second storage system; and
providing, by the universal node, a universal namespace to the client, wherein the universal namespace collectively presents information for the one or more files stored in a plurality of namespaces corresponding to the one or more storage systems, and a file of the one or more files is accessible via an address with respect to the universal namespace, and the catalog stores a mapping of addresses for files with respect to the universal namespace to the corresponding location information on the one or more storage systems.

2. The method of claim 1, wherein the file of the one or more files is accessible via the universal namespace such that the client accesses the file at a same address of the universal namespace regardless of whether the file is moved from the first storage system to the second storage system.

3. The method of claim 1, wherein a catalog service updates the catalog with a location of the file based on a storage system of the plurality of storage systems on which the file is stored.

4. The method of claim 1, further comprising:
determining, by one or more processors, a usage level of the file, wherein the file is stored in the first storage system; and
moving, by one or more processors, the file to the second storage system based at least in part on the determined usage level of the file.

5. The method of claim 4, further comprising:
updating, by one or more processors, the mapping of the address for the file to location information on the one or more storage systems based on the movement of the file.

6. The method of claim 4, further comprising:
performing at least a portion of the query on the file after the mapping of the address for the file to location information on the one or more storage systems is updated, wherein the universal node comprises a universal job tracker that tracks a status of a one or more jobs corresponding to the query.

7. The method of claim 6, wherein the universal job tracker obtains a corresponding status of at least a portion of the query from one or more data node job trackers.

8. The method of claim 4, wherein moving the file to the second storage system based on the determined usage level includes moving the file to a high performance storage system based on high usage level.

9. The method of claim 8, wherein the second storage system is a higher performance storage system than the first storage system.

10. The method of claim 4, wherein the usage level includes a usage frequency.

11. The method of claim 4, further comprising determining a predicted usage time based on the usage frequency.

12. The method of claim 11, wherein the moving the file to the second storage system based on the determined usage level includes moving the file to the second storage system based at least in part on the predicted usage time.

13. The method of claim 1, wherein the universal node is configured to interface with the first storage system and the second storage system based at least in part on a universal protocol plugin.

14. The method of claim 1, wherein to access the file the client does not directly use an address of the file in relation to the particular storage system of the plurality of storage system on which the file is located.

15. The method of claim 1, wherein the universal node comprises a plurality of protocols for a plurality of file systems, and the universal node uses corresponding ones of the plurality of protocols in connection with accessing the first storage system and the second storage system.

16. The method of claim 1, further comprising:
in response to receiving the query, determining a location of the one or more files in the universal namespace using the catalog; and
in response to a determination that the one or more files are located at the first storage system, sending a job corresponding to at least a portion of the query to the first storage system.

17. A system, comprising:
one or more processors configured to:
receive a query from a client;
access a catalog comprising location information for one or more files stored across one or more storage systems, the one or more storage systems comprising a first storage system and a second storage system, and a universal node being configured to interface with the first storage system and the second storage system; and
provide a universal namespace to the client, wherein the universal namespace collectively presents information for the one or more files stored in a plurality of namespaces corresponding to the one or more storage systems, and a file of the one or more files is accessible via an address with respect to the universal namespace, and the catalog stores a mapping of addresses for files with respect to the universal namespace to the corresponding location information on the one or more storage systems; and a memory coupled to the one or more processors and configured to provide the one or more processors with instructions.

18. The system of claim 17, wherein the one or more processors are further configured to:

determine a usage level of the file, wherein the file is stored in the first storage system; and move the file to the second storage system based at least in part on the determined usage level of the file.

19. The system of claim 18, wherein the one or more processors are further configured to:

update the mapping of the address for the file to location information on the one or more storage systems based on the movement of the file.

20. A computer program product, comprising a non-transitory computer readable medium having program instructions implemented by a processor circuitry when executed, the program instructions comprising instructions for:

receiving, by a universal node comprising one or more processors, a query from a client;

accessing, by the universal node, a catalog comprising location information for one or more files stored across one or more storage systems, the one or more storage systems comprising a first storage system and a second storage system, and the universal node being configured to interface with the first storage system and the second storage system; and providing, by the universal node, a universal namespace to the client, wherein the universal namespace collectively presents information for the one or more files stored in a plurality of namespaces corresponding to the one or more storage systems, and a file of the one or more files is accessible via an address with respect to the universal namespace, and the catalog stores a mapping of addresses for files with respect to the universal namespace to the corresponding location information on the one or more storage systems.

* * * * *